INVENTOR
JOHN W. LUDWIG,
BY
Raymond Wootton
ATTORNEY

Jan. 29, 1952 J. W. LUDWIG 2,583,580
WEB REGISTER CONTROL SYSTEM
Filed Jan. 8, 1947 3 Sheets-Sheet 3

INVENTOR
JOHN W. LUDWIG,
BY
Raymond Wholters
ATTORNEY

Patented Jan. 29, 1952

2,583,580

UNITED STATES PATENT OFFICE 2,583,580

WEB REGISTER CONTROL SYSTEM

John W. Ludwig, New Canaan, Conn., assignor, by mesne assignments, to Askania Regulator Company, Chicago, Ill., a corporation of Illinois Application January 8, 1947, Serial No. 720,869

23 Claims. (Cl. 271—2.6)

Although a substantial amount of research has been devoted to the problem of maintaining running and lateral register in apparatus of various types for operating on strip or web material, equipment of this type currently in use leaves much to be desired Difficulty has been encountered in maintaining the degree of register sufficiently close for the needs of multicolor printing operations, particularly in conjunction with high speed presses.

Various combinations of photoelectric cells and circuit interrupters have been proposed to compensate for the effects of shrinkage and slippage due to changes in atmospheric conditions, wear, and other influences, efforts have been made to avoid hunting in introducing the various corrections, but a survey of the trade has shown that the solutions proposed and the apparatus available have failed to keep pace with requirements.

In accordance with the present invention, the control of register can be effected much more accurately than was heretofore believed to be possible, with apparatus which can be installed on existing equipment. Instead of relying upon cumulative errors before introducing a correction, the present apparatus begins to correct for errors as soon as a rate of change of error is detected, even though the error itself may be zero at the time, the corrective effects taking into consideration not only the error itself, but its rate of change, its cumulative effect and the rate at which the error is being corrected. The invention contemplates register control apparatus for an element operating on a strip of material comprising means for continuously sensing the position of such element, means for sensing the position of the strip of material and means for rectifying relative displacement between the element and strip of material as a function of such displacement. The rectifying effect is also a function of the derivatives of such displacement; and a function of the integral of such displacements. Means are contemplated for modifying the rectifying effect as a function of that effect or of the rate of such effect, which may assume the form of means for providing a feed back from the member being corrected to the apparatus providing the correction.

It is contemplated that means be provided operating in synchronism with the element for producing a periodic signal which may be a peaked wave cyclic current having a characteristic varying with the position of the element and which may be a sinusoidal current such as would be produced by an alternating current generator.

It is also contemplated to provide means activated by the strip borne indicia for producing a periodic signal which may assume the form of light sensitive means such as a photoelectric cell. The initial phase relationship between the signals produced can be adjusted electrically in the present case by merely changing the setting of one or more components of the circuit. Any discrepancy occurring after the phase has been thus initially adjusted will then become effective to vary the relationship between the strip of material and the element for operating on it in accordance with the time relationship between the impulse produced by the light sensitive means and the current having a characteristic varying with the position of the element. Inasmuch as a variation from registry may require either a positive or negative correction, the apparatus has been designed to be selective in this regard so as to introduce the correction in the proper direction.

The apparatus comprises means for sensing the phase relationship between the impulse produced by the light sensitive means and the current produced by the means indicating the position of the element operating on the strip of material, and means actuated by the sensing means for continuously varying the relationship between the strip and element in response to phase displacement between them. The invention also contemplates means for producing a composite signal as a function of displacement between the signals produced by the strip and position of the element and means for correcting the displacement as a function of the composite signals. Means may be provided for establishing a reference value for such a composite signal or signals whereupon the corrections will occur as a function of the amplitude of such composite signal with respect to such reference value. The circuit may include limiting means so as to apply the corrective effect in the form of a substantially flat topped wave having varying periods to facilitate the use of a direct current motor for applying the corrective force.

Whereas the invention is capable of many applications, it will be described in connection with a multicolor press wherein the element operating on the web of material is a printing cylinder and in which the correction is applied to such cylinder to maintain proper registration.

A more complete understanding of the invention will follow from a description of the accompanying drawings wherein.

Figure 1:
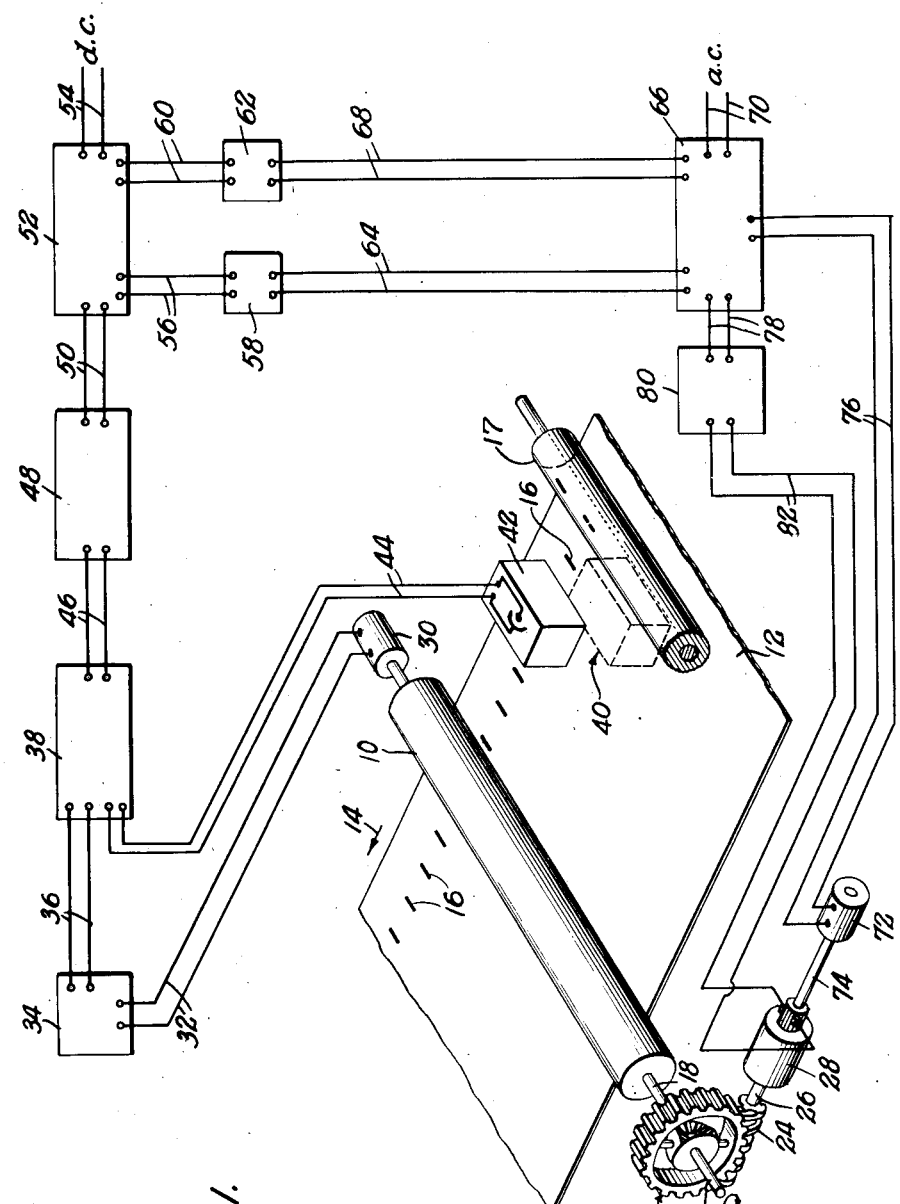
Fig. 1 is a diagrammatic showing of apparatus embodying the present invention.

A printing cylinder 10 representing the element to be controlled, is operating on a web of material 12 advancing from right to left in the direction of the arrow 14 and bearing register marks or indicia 16 previously applied as by a preceding printing cylinder of conventional form, as indicated at 17, Fig. 1. One end of the cylinder shaft 18 is driven through differential gearing 20 by means of a main drive shaft 22, corrections being introduced through the differential gearing by a worm 24 secured to the shaft 26 of a reversible direct current motor 28.

The opposite end of the cylinder shaft 18 drives an alternating current generator 30 whose output is fed through leads 32 to a phase shifting network 34 whose output is introduced through leads 36 to what may be termed a detector 38. A light source 40 indicated in broken lines as being below the web 12 cooperates with a photoelectric cell 42 to produce pulses in accordance with the register marks 16 to transmit a signal through leads 44 to the detector 38 wherein a current will be produced to correspond with any displacement in phase between the web and cylinder, and such current amplified for transmission through leads 46 to a filter 48 whose output in the form of a smooth wave is transmitted through leads 50 to a modifier 52 where it is combined with a reference direct current supplied through leads 54 to bring the composite characteristic down to the time axis, the resulting characteristic then being amplified and transmitted over one path through leads 56 to an integrating circuit 58 and over another pair of leads 60 to a differentiating circuit 62. The integrating circuit 58 reduces the static error of the system by detecting very slowly accumulating errors, delivering as an output the error plus its integral. The differentiating circuit 62 detects a rate of change of the error and its output is the error plus its derivative. The output of the integral circuit 58 is transmitted over leads 64 to a combining circuit 66 where it is mixed with the output of the derivative circuit 62 transmitted over leads 68, and into which an alternating current is fed through leads 70, and in addition, all of these inputs are combined algebraically with the output of a D. C. generator 72 coupled to the shaft 74 of the correction motor 28, to produce a feedback effect through the leads 76.

The composite signal produced in the circuit 66 is transmitted through leads 78 to a limiter 80 which generates a substantially square wave of constant amplitude changing from positive to negative when the output of the circuit 66 passes through zero. The output from the limiter 80 is applied to the direct current motor 28, through leads 82, which will be subjected to alternate positive and negative values of torque of different duration whenever there is an effective error voltage in the system. Since the voltage applied to the correcting motor 28 combines the error, its derivative, its integral and a feed back corresponding in amplitude and direction to the movements of the motor 28 itself, it will follow that the corrective effect applied to the cylinder 10 will take into consideration the error itself, the rate of change of the error, the accumulated error and the corrective effect itself.

Figure 2:
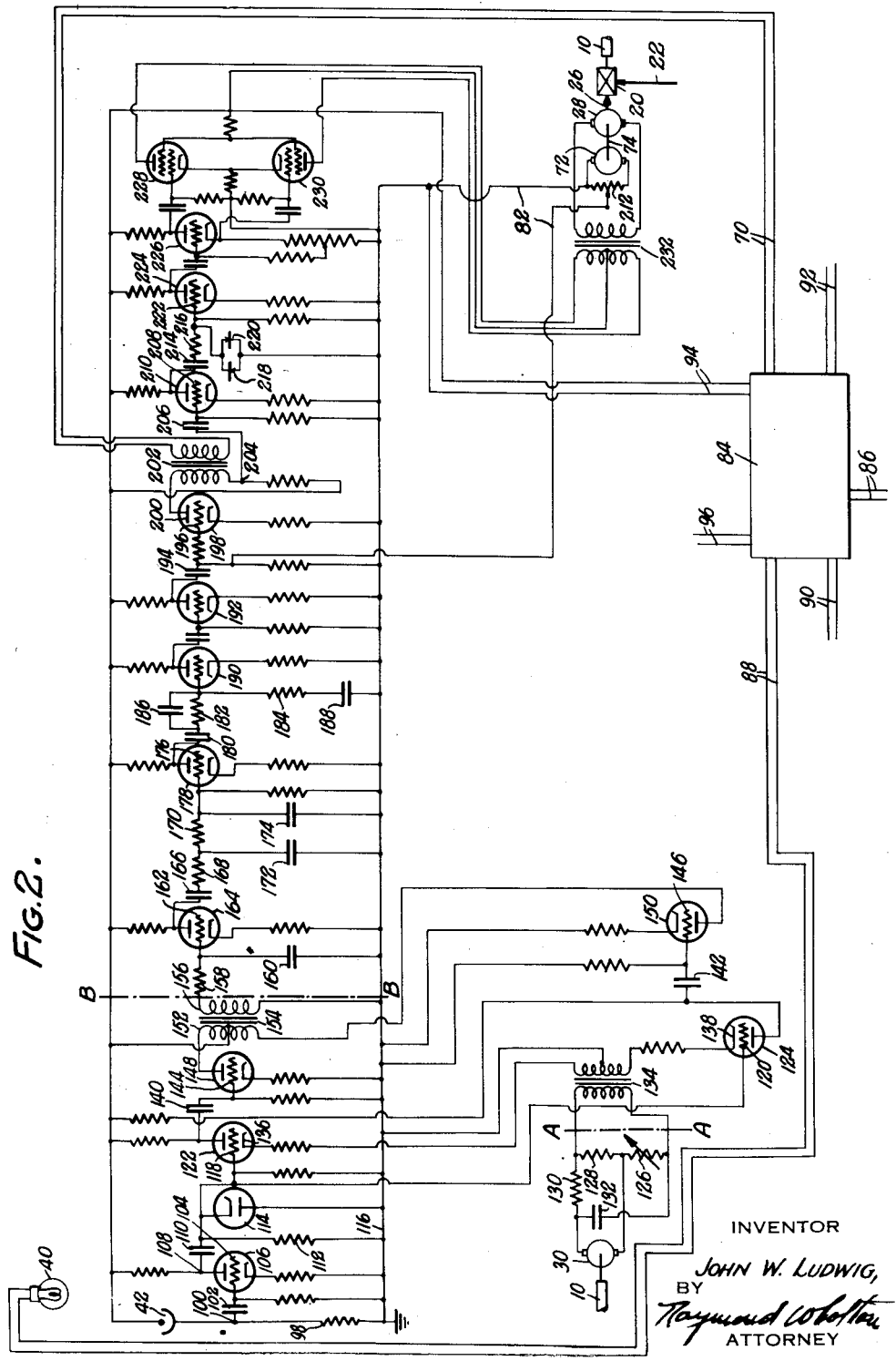
Fig. 2 is a circuit diagram based upon the apparatus of Fig. 1.

Referring to the circuit depicted in Fig. 2 of the drawing, a clearer concept of the circuit relationship will be possible. Insofar as it has been feasible, reference characters corresponding to those of Fig. 1 have been employed. A power supply 84 for the various circuits is provided with input leads 86 from a suitable source and the following output leads: leads 88 for the light source 40; leads 90 for supplying the field of generator 30; leads 92 for supplying the fields of motor 28 and generator 72; leads 70 for the combining circuit 66; leads 94 for the plate circuits; and leads 96 for the tube heaters.

As a register mark 16 carried by the web 12 passes under the photoelectric cell 42, the momentary reduction in the light intensity on the cell results in a corresponding reduction in current passing through the resistor 98, correspondingly momentarily reducing the potential at the point 100 of the circuit. The pulse so produced passes through a condenser 102 to a control electrode 104 of a valve 106, momentarily reducing its conductive effect. This reduction of conductivity of the valve results in an increased potential at a point 108 on the output side of the valve. This momentary rise in potential is transferred through a condenser 110 and a resistor 112 which differentiates the pulse. A valve 114 passes the negative pip of the differentiated pulse to a ground conductor 116 leaving the positive pip of substantially constant amplitude to appear at the control elements 118 and 120 of the valves 122 and 124 respectively. Signals produced by the generator 30 are passed through the adjustable phase shifting network 34 comprising a potentiometer 126, resistors 128 and 130 and a condenser 132, and through a transformer 134 to a second pair of control elements 136 and 138 of the valves 122 and 124 respectively. As a result, the signals applied to the control elements 118 and 120 will cause the output potentials of the valve 122 and 124 to vary in accordance with the instantaneous amplitude of the signals applied to their control elements 136 and 138 respectively.

The outputs from these valves are varying signals which pass through condensers 140 and 142 to the control elements 144 and 146 of valves 148 and 150 respectively. The outputs from these valves are subtracted in the primary 152 of transformer 154 the difference being transmitted from its secondary 156 to a filter network comprising a resistor 158 and a condenser 160, the filtered signal being applied to the control element 162 of a valve 164, amplifying the signal, which then passes through a condenser 166 and a filter network comprising resistors 168 and 170 and condensers 172 and 174. The filtered signal is then applied to a control electrode 176 of a valve 178 where it is amplified and transmitted through a condenser 180 to a network including resistors 182 and 184 and condensers 186 and 188. In this network, the resistors 182 and 184 combine with the condenser 186 to produce a signal which is a function of the error and its derivative while the resistors 182 and 184 combine with the condenser 188 to produce a characteristic which is a function of the error and its integral, this network corresponding with those depicted of Fig. 1 of the drawings as the derivative and integral circuits 58 and 62. In other words, the output of this network represents the incoming signals plus their first derivative plus their integral. The composite signal is further amplied by means of valves 190 and 192, the output of valve 192 passing through a condenser 194 and being applied to a control electrode 196 of a valve 198. To another control electrode 200 of this valve, there is applied an alternating signal from the power supply through leads 78 and transformer 202, this alternating signal being of sinusoidal form and always positive. These signals applied to the valve 198 are additive so that the signal existing at a point 204 on the output side of the valve will vary in accordance with the sum of the applied signals. This summation signal is transmitted through a condenser 206 to a control electrode 208 of a valve 210. It should be noted that the output of the generator 72, which is rendered adjustable by means of a potentiometer 212 is supplied through leads 82 to the input side of the valve 198 where it is also added and thus contributes to the signal occurring at the point 204.

The output from the valve 210 is supplied through a condenser 214 to a resistor-rectifier network comprising a resistor 216 and rectifiers 218 and 220 corresponding with the limiter 86 depicted in Fig. 1. The output from this network is applied to a control electrode 222 of a valve 224 in the form of a substantially square wave where it is amplified and fed through a phase inverter valve 226, power amplifier valves 228 and 230, and transformer 232 to the motor 28.

It will occur to those skilled in the art that the circuits represented in Fig. 2 of the drawings can be modified appreciably and still produce the desired results. One such modification applicable to the input network for the transformer 154 of Fig. 2 has been depicted in Fig. 3, which can be inserted bodily between the broken lines A—A and B—B of the circuit shown in Fig. 2.

Signals from the generator 30 passing through the phase shifting network 126, 128, 130 and 132 are impressed upon the primary winding 234 of the transformer 236 of the modified circuit. The secondary 238 of this transformer transmits the signal through a network including a resistor 240 and rectifiers 242 and 244 which deliver a substantially square wave to a control electrode 246 of a valve 248.

Assuming that a pulse from the photoelectric cell 42 occurs during a negative half cycle from the rectifiers 242 and 244, the following operation will take place: The negative signal from the rectifiers appearing on the control element 246 of the valve 248 will reduce the conductivity of valve 248, resulting in a corresponding reduction of current through a resistor 250 in the output circuit of the valve, thus raising the potential of a point 252 between the resistor 250 and the valve anode 254. This rise in potential becomes effective through a condenser 256, on a control electrode 258 of a valve 260 to increase the conductivity of the valve. The potential rise also becomes effective through resistors 261 and 262, and condenser 164, to bias a control electrode 266 of a valve 268. The increased conductivity of valve 260 lowers the potential at a point 270 in its anode circuit, which potential drop becomes effective through a condenser 272 upon a control grid 274 of a valve 276 to substantially block it, thus increasing the potential of a point 278 in its anode circuit. The point 278 is connected through a conductor 280 with another control electrode 282 of the valve 268, which, combined with the potential of its electrode 266 results in an increased conductance of the valve, and a corresponding reduction of potential at a point 284 in its output circuit. This reduction of potential is rendered effective through a conductor 286 to bias a control electrode 288 of valve 276, which in cooperation with the effect of grid 274, definitely prevents conduction through the valve 276.

The rise in potential at the point 278 is effective through suitable leads to bias control electrodes 290 and 292 of valves 294 and 296 respectively. Having assumed a condition under which the output of the rectifiers 242 and 244 is negative, the current in a winding 298 of transformer 236 will be at a positive value, and transmitted over a conductor 300 to a control electrode 302 of valve 294 will increase the conductivity of the valve. Accordingly, a point 304 in the anode circuit of the valve will undergo a decrease in potential, which will be transferred through a condenser 306 to a control element 308 of a valve 310.

Figure 3:
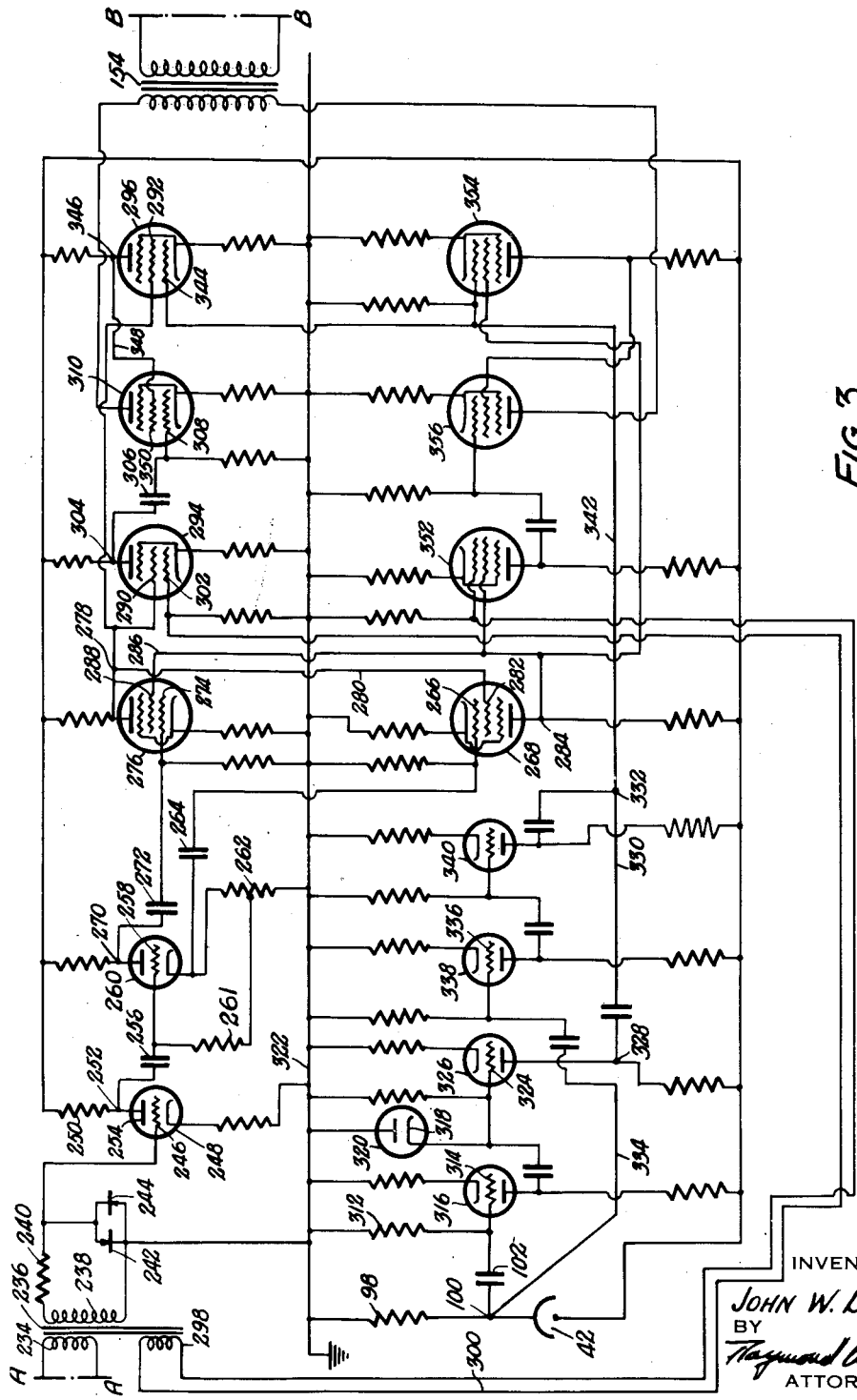
Fig. 3 is a modification of a portion of the circuit depicted in Fig. 2.

Simultaneously with the portion of the operation of the circuit of Fig. 3 described thus far, when a registration mark on the web is interposed between the light source and the photoelectric cell 42, there will be a reduction in the current passing through resistor 98 and a consequent decrease in potential at the point 100. The potential drop will become effective through a network comprising a condenser 102 and a resistor 312 to vary the bias on a control element 314 of a valve 316, the resistor-condenser network serving to differentiate the pulse. This differentiated pulse will be amplified by valve 316 whose output is connected with a control electrode 318 of a valve 320 which passes the negative components of the pulse to ground through a conductor 322. The output of valve 316 is also connected with a control grid 324 whose valve 326 will be rendered conductive under these conditions and the potential of a point 328 in its anode circuit will be lowered and thereby a negative pulse will occur in a conductor 330 connected with the point 328 and with another point 332 in the circuit. The pulse from the photoelectric cell is also applied through a conductor 334 to a control electrode 336 of a valve 338, which cooperates with a valve 340 to amplify the pulse without differentiating it, and combining the amplified pulse at the point 332 with the output of the valve 326. The composite pulse at the point 332 is substantially square topped, in which form it is applied through a conductor 342 to a control electrode 344 of valve 296.

Since the valve 296 was rendered conductive by the pulse delivered to its electrode 292 from the valve 276, the effect of the pulse applied to the electrode 344 will be to reduce the conductivity and thereby increase the potential of a point 346 in its anode circuit. This increased potential becomes effective through a conductor 348 upon a control electrode 350 of the valve 310 which becomes conductive to a degree which will vary as a function of the signal applied to its control element 308 from the point 304, and consequently the output potential of the valve 310 will vary in proportion to its conductivity to apply pulses of varying amplitude to the primary winding of the transformer 154.

During the operation just described the potential drop at the point 284 was sufficient to render valves 352 and 354 substantially non-conducting and accordingly a valve 356 ineffective. However, during a positive half cycle from the rectifiers 242 and 244, the conditions described would be modified to the extent that valves 352, 354 and 356 would be effective to control the signal applied to the transformer 154, in which case valves 294 and 296 would be rendered non-conductive and valve 310 ineffective.

For simplification of the drawings, Fig. 3 has not included the entire circuit necessary for register control, but it should be construed as replacing that portion of the Fig. 2 circuit between the lines A—A and B—B for an understanding of its cooperation with the remaining portions of the system.

Inasmuch as the possible modifications of the circuits described for achieving the desired results are almost unlimited, no effort will be made to describe further arrangements even though they have already suggested themselves. Accordingly, the invention should not be limited beyond the scope of the appended claims.

I claim:

1. Register control apparatus for a system including a cyclically movable element for operating on a moving strip of material; comprising a positional displacement device having a mechanically and cyclically movable member and means for sensing magnitude of displacement of said member from a selected position, drive means for moving said member in selected phase relation to said element to sense magnitude of displacement of said element from a preselected position in its movement cycle, means actuable by such a strip for indicating times at which such strip arrives at positions requiring coincidence of such preselected position of said element, means responsive to both said device and indicating means for detecting magnitude of such element displacement from such preselected position at times indicated by said strip actuable means, and means responsive to said detecting means for rectifying such displacement as a function of such detected magnitude.

2. Register control apparatus for a system including a cyclically movable element for operating on a moving strip of material; comprising means actuable by such a strip for sensing times of arrival thereof at positions requiring definite positioning of said element in its movement cycle, means operated in timed relation with said element and responsive to said strip actuable means for sensing the exact instant position of said element in its movement cycle at such strip arrival instants, and means responsive to said last named sensing means for rectifying variance from registration between said element and such a web as a function of the error between the sensed actual instant exact position of said element and the definite positioning required at such instants.

3. Register control apparatus for a system including a cyclically movable element for operating on a moving strip of material, comprising a mechanically drivable and cyclically operating device for producing a signal having a magnitude varying cyclically in predetermined phase relation with the operation cycle of said device, means actuable by such a strip for intermittently producing pulsed signals respectively occurring at times of arrival of such strip at successive positions respectively requiring preselected definite positioning of said element, means for detecting instant magnitude of such varying signal at instants of production of such pulsed signals, and means responsive to said detecting means and arranged for rectifying variance between times of arrival of such strip at such positions and arrival of said element at its preselected position as a function of such detected magnitude.

4. Register control apparatus for a system including a cyclically movable element for operating on a moving strip of material, comprising a mechanically and cyclically operable device for producing a signal having a characteristic varying cyclically in preselected phase relation with the operation cycle of said device, means for driving said device in preselected phase relation with said element, means actuable by such a moving strip for intermittently producing sharply pulsed signals of equal magnitudes and respectively occurring at times of arrival of such strip at positions intended to coincide with successive arrivals of said element at its preselected position, means responsive to both said varying and pulsed signals for producing a control signal of magnitude proportional to their resultant, and means responsive to such control signal for rectifying variance from coincidence of such strip and element positions as a function of its magnitude.

5. Register control apparatus for a system including a cyclically movable element for operating on a moving strip of material, comprising light sensitive means actuable by register marks carried on such a strip for periodically producing sharply pulsed electrical impulses respectively representative of positions of such strip requiring preselected and definite positioning of said element, a mechanically operable device for producing periodic cyclic wave electric impulses having a selected phase relation to operation cycles of said device and means for driving said device in preselected phase relation to said element whereby a predetermined magnitude of such wave impulse is representative of such preselected positioning, and means responsive to such pulsed and cyclic impulses for rectifying variance between times of occurrence of such strip positions and preselected element positioning as a function of variance of instant magnitude of such varying electrical impulses from such predetermined magnitude at the time of such sharply pulsed electrical impulses.

6. Register control apparatus for a system including a cyclically movable element for operating on a moving strip of material, and means for driving said element and such a strip including speed adjustment mechanism actuable for varying their relative speed, said apparatus comprising means actuable by such a strip for producing sharply pulsed signals timed to occur at instants of arrival of such strip at positions requiring coincidence of definite positioning of said element in its movement cycle, cyclically operable signal means for producing a signal having a characteristic periodically varying through a definite cycle with the operating cycle of said device, mechanism for operating said signal means in preselected phase relation to said element, means for detecting instant magnitude of such varying signal at instants of pulsed signal production, and means responsive to said detecting means for operating said speed adjustment mechanism to rectify variance from coincidence of such strip positions and definite element positioning by actuating said mechanism to vary the relative speed of said element and such a strip as a function of such detected magnitude.

7. In a register control apparatus for a system that includes a cyclically movable element for operating a moving strip of material, means for moving such a strip, and mechanism for varying relative speeds of said element and means; the combination with detector means actuable by such a strip to indicate times of arrival of the latter at positions requiring coincidence of definite positioning of said element in its movement cycle, of a mechanically operable signal device for producing a signal of a magnitude cyclically varying in predetermined relation to the drive cycle of said device, means for driving said signal device in preselected phase relation to said element whereby such definite positioning of the latter is represented by a definite magnitude of such signal, and means responsive to both said signal device and detector means for operating said mechanism to correct variance from such coincidence as a function of variance of such signal magnitude at times indicated by such detector means from the definite magnitude representative of the required definite element positioning.

8. Register control apparatus for a system that includes a cyclically movable element for operating on a moving strip of material; comprising the combination with means for producing sharp voltage pulses and actuable by indicia carried by such a strip at locations for timing such pulses to occur at times of arrival of such strip at positions requiring coincidence of definite positioning of said element in its movement cycle, of a mechanically and cyclically operable signal device for periodically producing voltage varying through definite magnitude cycles in preselected phase relation to operation cycles of said device and means for driving said device in preselected phase relation to said element whereby varying instant magnitude of such voltage is representative of varying instant position of said element in its movement cycle, means for developing a signal proportional in magnitude to degree of variance of such strip positions and definite element positioning by detecting instant magnitude of such varying voltage at instants of voltage pulse production, and means responsive to such a signal for rectifying such variance from coincidence as a function of such signal magnitude.

9. Register control apparatus for a system that includes a cyclically movable element for operating on a moving strip of material, comprising the combination with means for producing sharp voltage pulses and actuable by indicia carried by such strip in locations for timing such pulses to occur at times of arrival of such strip at positions requiring coincidence of definite positioning of said element in its movement cycle, of a mechanically and cyclically operable signal device for producing a periodic voltage output varying through definite magnitude cycles having a preselected phase relation to operation cycles of said device, means for driving said device in preselected phase relation to said element whereby varying magnitude of such voltage is representative of a varying position of said element, means for detecting instant magnitude of such varying voltage at instants of pulse production, and means responsive to said detecting means for rectifying variance from coincidence of such strip positions and definite element positioning as a function of such detected magnitude.

10. Register control apparatus for a system that includes a cyclically movable element for operating on a moving strip of material, comprising the combination with means for producing sharp voltage pulses and actuable by indicia carried by such a strip in locations for timing such pulses to occur at times of arrival of such strip at positions requiring coincidence of definite positioning of said element in its movement cycle, of a mechanically and cyclically operable device for producing periodic voltage varying through a definite magnitude cycle having a preselected phase relation to the operating cycle of said device, means for driving said device in a preselected phase relation to said element to produce such cycles in a preselected phase relation to movement cycles of said element whereby varying instant magnitude of such voltage is representative of varying position of said element and a predetermined magnitude of voltage represents the definite element positioning required at times of strip arrival at such positions, means for detecting instant magnitude of such varying voltage at the instants of voltage pulse production, means for developing a direct current voltage of magnitude proportional to such detected instant magnitude, and means responsive to such direct current voltage for rectifying variance from coincidence of such strip positions and definite element positioning as a function of variance of such direct current voltage from a predetermined magnitude representative of such coincidence.

11. Register control apparatus for a system that includes a cyclically movable element for operating on a moving strip of material; comprising the combination with means for producing sharp voltage pulses of equal magnitudes and actuable by indicia carried by such a strip in locations for timing such pulses to occur at times of arrival of such strip at positions requiring coincidence of definite positioning of said element in its movement cycle, of a mechanically and cyclically operable device for producing periodic voltage varying through a definite magnitude cycle having a predetermined phase relation to the operating cycle of said device, means for driving said device in preselected phase relation to said element for producing such cycles in a preselected phase relation to movement cycles of said element whereby a definite instant magnitude of such varying voltage is representative of the definite positioning of said element required at times of strip arrival at such positions, means responsive to such pulses and varying voltage for developing a direct signal voltage of magnitude proportional to the resultant of the summarized voltage pulse magnitude and instant magnitude of the varying voltage at the time of such pulse, and means responsive to such signal voltage for rectifying variance from coincidence of such strip arrival times and definite element positioning as a function of variance of magnitude of such direct current voltage from a magnitude representative of such coincidence.

12. Register control apparatus for a system that includes a cyclically movable element for operating on a moving strip of material; comprising the combination of claim 10, including a computing circuit responsive to energization by such direct current voltage for computing the rate of change thereof, and wherein said variance rectifying means is responsive to the output of said computing circuit for rectifying such variance as a function of such rate of change.

13. Register control apparatus for a system that includes a cyclically movable element for operating on a moving strip of material; comprising the combination of claim 11, including a computing circuit responsive to energization by such direct current voltage for computing the rate of change thereof, and wherein said variance rectifying means is responsive to the output of said computing circuit for rectifying such variance as a function of such rate of change.

14. Register control apparatus for a system that includes a cyclically movable element for operating on a moving strip of material; comprising the combination of claim 10, including a computing circuit responsive to energization by such direct current voltage for computing cumulative variation thereof, and wherein said variance rectifying means is responsive to the output of said computing circuit for rectifying such variance as a function of such computed cumulative variation.

15. Register control apparatus for a system that includes a cyclically movable element for operating on a moving strip of material; comprising the combination of claim 11, including a computing circuit responsive to energization by such direct current voltage for computing cumulative variation thereof, and wherein said variance rectifying means is responsive to the output of said computing circuit for rectifying such variance as a function of such computed cumulative variation.

16. Register control apparatus for a system that includes a cyclically movable element for operating on a moving strip of material; comprising the combination of claim 10, including a computing circuit responsive to energization by such direct current voltage for computing a derivative of variation thereof, and wherein said variance rectifying means is responsive to the output of said computing circuit for rectifying such variance as a function of the derivative computed by said circuit.

17. Register control apparatus for a system that includes a cyclically movable element for operating on a moving strip of material; comprising the combination of claim 11, including a computing circuit responsive to energization by such direct current voltage for computing a derivative of variation thereof, and wherein said variance rectifying means is responsive to the output of said computing circuit for rectifying such variance as a function of the derivative computed by said circuit.

18. Register control apparatus for a system that includes a cyclically movable element for operating on a moving strip of material; comprising the combination of claim 10, including an integrating circuit responsive to energization by such direct current voltage, and wherein said variance rectifying means is responsive to the output of said integrating circuit for rectifying such variance as a function of the integral of variation of such direct current voltage.

19. Register control apparatus for a system that includes a cyclically movable element for operating on a moving strip of material; comprising the combination of claim 11, including an integrating circuit responsive to energization by such direct current voltage, and wherein said variance rectifying means is responsive to the output of said integrating circuit for rectifying such variance as a function of the integral of variation of such direct current voltage.

20. Register control apparatus for a system that includes a cyclically movable element for operating on a moving strip of material; comprising the combination with means for placing on such a strip of material indicator marks spaced to represent strip positions requiring coincidence with definite positioning of said element in its movement cycle of arrival of such marks at a definite point adjacent said element, and light sensitive means for detecting arrival of such marks at said point, of mechanically and cyclically operable means for producing periodic voltage of magnitude varying through preselected definite cycles having a predetermined phase relation to operating cycles of said device, means for driving said voltage-producing means in timed relation to movement cycles of said element to produce such voltage cycles at substantially the frequency of arrival of such marks at said point whereby instant magnitude of such voltage at such arrival times is representative of degree of variance of said element from the definite positioning required by the strip at such times, means for producing sharp voltage pulses from the output of said light sensitive means and in timed relation to arrival of such marks at said point, means for detecting the instant magnitude of such varying voltage at the times of production of such voltage pulses, and means responsive to said detecting means for rectifying variance from coincidence of such strip positions and definite positioning of said element as a function of variance of such detected magnitude from a magnitude representative of such coincidence.

21. Register control apparatus for a system that includes a cyclically movable element for operating on a moving strip of material; comprising the combination of claim 20, and including variable phase shifter means adjustable for selection of the phase relation between cycles of the varying voltage and movement cycles of said element.

22. Register control apparatus for a system that includes a cyclically movable element for operating on a moving strip of material, comprising the combination with means for producing sharp voltage pulses from indicia carried by such a strip in locations for timing such pulses to occur at times of arrival of such strip at positions requiring coincidence of definite positioning of said element in its movement cycle, of a mechanically and cyclically operable varying voltage generator coupled with said element for driving in a preselected phase relation therewith to produce a periodic output voltage varying in definite cycles of magnitude variation having a preselected phase relation to movement cycles of said element, means for detecting instant magnitude of such varying voltage at instants of voltage pulse production, and means responsive to said detecting means for varying the relative speed of said element and such a strip as a function of variance of such detected magnitude from a magnitude representative of coincidence of such strip positions and definite positioning of said element and in a sense opposite to sense of such variance.

23. Register control apparatus for a system that includes a cyclically movable element for operating on a moving strip of material; comprising the combination of claim 22, wherein said voltage generator is an alternating voltage generator the output of which has instant magnitude cycles occurring in predetermined phase relation to operation cycles of said device and each of which includes cycle parts of opposite phase sense, said combination including variable phase shifter coupled in the output of said generator for adjusting phase of such voltage cycles relative to such voltage pulses to cause the latter to initially occur between such positive and negative cycle parts, and means for discriminating between the phase sense of cycle parts within which such pulses occur and for producing a signal voltage having sense and magnitude characteristics, and wherein said relative speed varying means is arranged for response to such signal voltage.

JOHN W. LUDWIG.

REFERENCES CITED

The following references are of record in the file of this patent:

UNITED STATES PATENTS

| Number | Name | Date |
|---|---|---|
| 2,105,185 | Degnan | Jan. 11, 1938 |
| 2,105,598 | Hubbard | Jan. 18, 1938 |
| 2,151,570 | Shoults et al. | Mar. 21, 1939 |
| 2,206,695 | Guannella | July 2, 1940 |
| 2,230,715 | Cockrell | Feb. 4, 1941 |
| 2,250,209 | Shoults et al. | July 22, 1941 |
| 2,262,362 | Gulliksen | Nov. 11, 1941 |
| 2,396,706 | Kott | Mar. 19, 1946 |
| 2,414,430 | Nisbet | Jan. 14, 1947 |
| 2,427,771 | Erbe | Sept. 23, 1947 |

OTHER REFERENCES

Publication, Journal of Electrical Engineers, pages 601–603, published in December 1946, and is now filed in 318/30.